(12) United States Patent
Sabb

(10) Patent No.: US 8,967,228 B2
(45) Date of Patent: Mar. 3, 2015

(54) TEMPORARY WINDOW

(76) Inventor: Adelaide Sabb, Fords, NJ (US)

( * ) Notice: Subject to any disclaimer, the term of this patent is extended or adjusted under 35 U.S.C. 154(b) by 460 days.

(21) Appl. No.: 13/374,961

(22) Filed: Jan. 25, 2012

(65) Prior Publication Data

US 2013/0186004 A1     Jul. 25, 2013

(51) Int. Cl.
*A47H 23/00*     (2006.01)
*A47H 1/00*     (2006.01)
*A47H 13/00*     (2006.01)
*A47H 15/00*     (2006.01)
*E06B 3/00*     (2006.01)
*E06B 9/00*     (2006.01)
*B60J 1/10*     (2006.01)

(52) U.S. Cl.
USPC ............... 160/368.1; 160/237; 160/370.21; 160/180; 296/146.15

(58) Field of Classification Search
CPC ............ B60J 1/025; B60J 1/2094; B60J 1/08; E06B 3/285; E06B 3/66; E06B 9/673; E06B 9/521; E06B 9/52
USPC ................. 160/330, 368.1, 370.21; 296/95.1, 296/96.11, 84.1, 96.21, 107.07, 145; 428/40.1, 44, 53; 49/380, 506; 135/117
See application file for complete search history.

(56) References Cited

U.S. PATENT DOCUMENTS

| 1,356,389 | A | * | 10/1920 | Morse ........................... 296/145 |
| 2,092,914 | A | | 9/1937 | Griest ........................... 160/354 |
| 2,298,783 | A | | 10/1942 | Burnett ......................... 160/354 |
| 2,619,168 | A | | 11/1952 | Leverence .................... 160/354 |
| 2,665,754 | A | | 1/1954 | Claussen et al. ............. 160/354 |
| 2,937,700 | A | | 5/1960 | Gibbons ....................... 160/354 |
| 3,064,725 | A | * | 11/1962 | Roark ........................... 160/354 |
| 3,085,621 | A | | 4/1963 | Meranto ........................ 160/90 |

(Continued)

FOREIGN PATENT DOCUMENTS

| JP | 9132434 | 5/1997 | ............. B05C 21/00 |
| JP | 10119567 | 5/1998 | ............. B29C 45/14 |
| JP | 10129249 | 5/1998 | ................ B60J 1/02 |

OTHER PUBLICATIONS

"Types of Materials You Can Use as Temporary Auto Glass" found at http://www.experts.merchantcircle.com/articles/Types-of-Materials-You-Can-Use-as-Temporary-Auto-Glass/1017326.

(Continued)

*Primary Examiner* — Blair M Johnson
*Assistant Examiner* — Jeremy Ramsey
(74) *Attorney, Agent, or Firm* — Ernest D. Buff, Esq.; Ernest D. Buff & Assoc. LLC; Harry Anagnos

(57) ABSTRACT

A temporary window has at least two sheets of thin plastic resin correspondingly comprising a center surrounded by at least one perimeter edge. The centers of the sheets are bonded to one another while the perimeters are not. Each of the perimeter edges of the sheets has an inner surface with an adhesive coating substantially thereon. The perimeters are arranged in relation to one another so that the adhesive inner sides create a v-shaped ravine adapted to adhere to a structure contiguous with an opening. The temporary window is especially suited to temporarily cover a window opening when the window glass is broken or otherwise non-functional. Uses include temporary windows for land vehicles, such as cars and trucks, marine craft, such as boats and the like, as well as windows in a residential or business establishment. The temporary window optionally includes a gap for fresh air in a vehicle's passenger compartment.

10 Claims, 9 Drawing Sheets

(56) References Cited

U.S. PATENT DOCUMENTS

| | | | |
|---|---|---|---|
| 3,251,399 A * | 5/1966 | Grossman | 160/180 |
| 3,749,147 A | 7/1973 | Hess et al. | 160/354 |
| 4,139,233 A | 2/1979 | Bott | 296/200 |
| 4,607,875 A | 8/1986 | McGirr | 296/97.7 |
| 4,889,754 A * | 12/1989 | Vargas | 428/41.4 |
| 5,524,694 A | 6/1996 | Arapis | 160/370.21 |
| 6,062,630 A * | 5/2000 | Taylor | 296/146.14 |
| 6,352,299 B1 | 3/2002 | Ames et al. | 296/146.2 |
| 6,869,127 B2 | 3/2005 | Dohle | 296/146.1 |
| 7,090,283 B2 | 8/2006 | Farley | 296/146.2 |
| 7,137,428 B1 | 11/2006 | Alford | 160/105 |
| 7,350,244 B1 * | 4/2008 | Handley | 4/558 |
| 7,452,025 B2 | 11/2008 | Grindle | 296/152 |
| 2005/0133169 A1 * | 6/2005 | Stahl | 160/87 |
| 2006/0200901 A1 * | 9/2006 | Beyda | 4/558 |
| 2007/0181272 A1 | 8/2007 | Lewis | 160/368.1 |
| 2009/0101289 A1 * | 4/2009 | Sheehan | 160/89 |

OTHER PUBLICATIONS

"*Insta-Cling Extra Dark Professional Tint Film*" Found At http://www.amazon.com/Insta-Cling-Extra-Dark-Professional-Tint/dp/B000EBKG9A.

"*CRL WeatherGuard: 26" × 32" Temporary Window*" found at http://www.intropc.com/item-21889-tw2632-weatherguard-26-x-32-temporary-window.html.

* cited by examiner

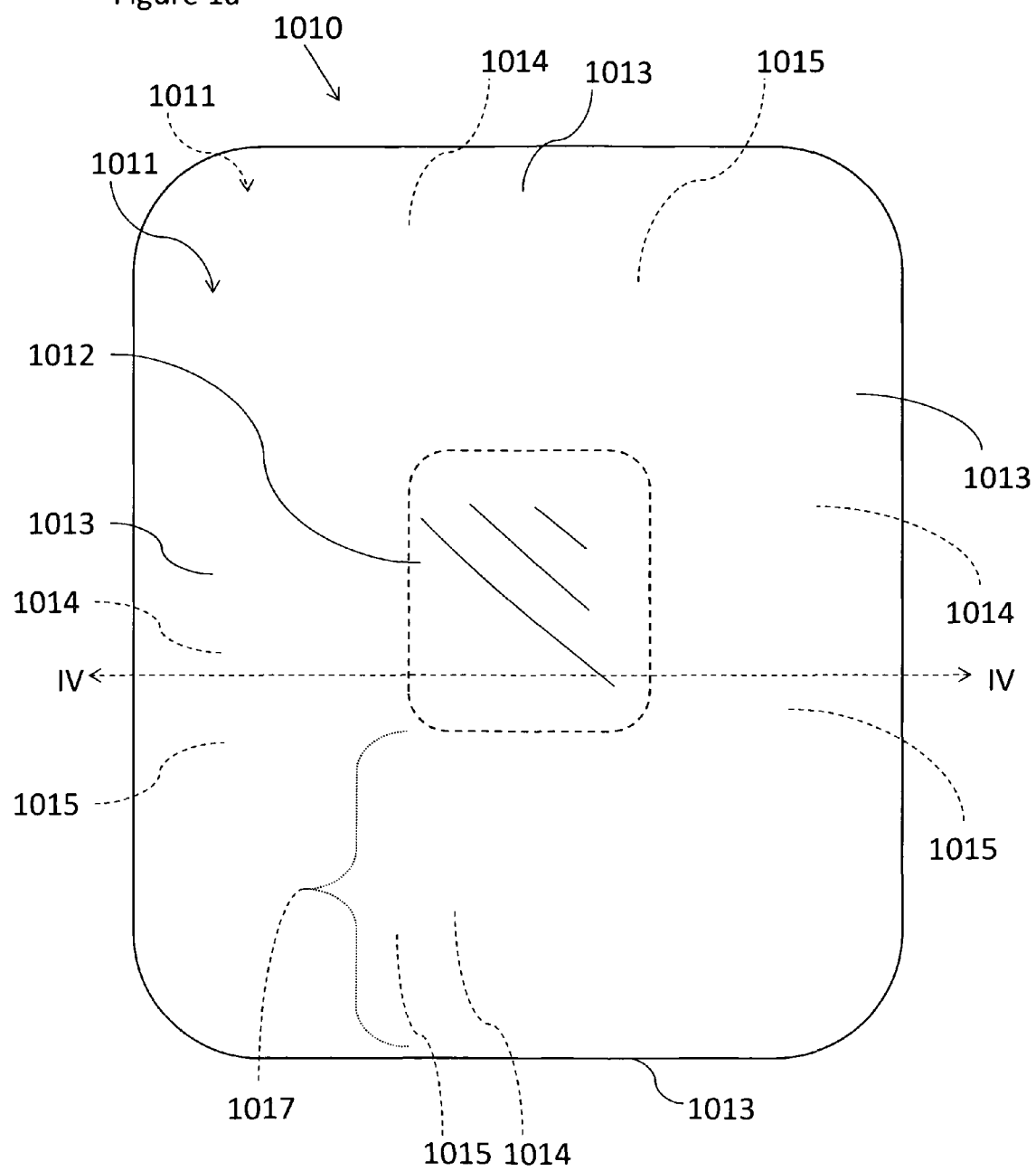

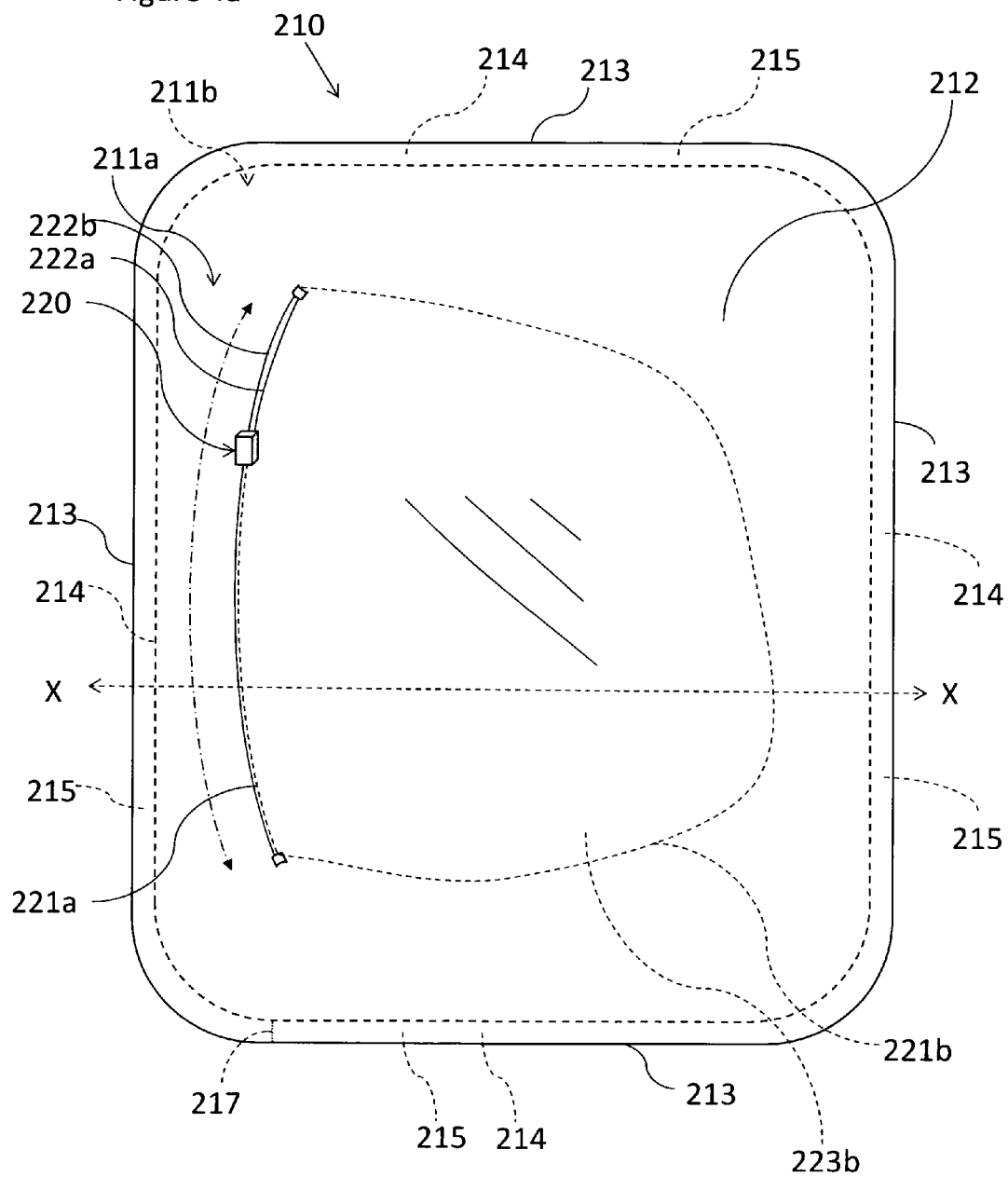

TEMPORARY WINDOW

BACKGROUND OF THE INVENTION

1. Field of the Invention

The present invention relates to windows; and, more particularly to a temporary window device for use in land vehicles, marine craft and residential or commercial buildings.

2. Description of the Prior Art

When a car or vehicle window breaks or is damaged, until it is repaired or replaced, a plastic bag or plastic piece is generally taped over the broken window and/or window gap to protect the inside of the vehicle from exposure to the outside. Unfortunately, the make-shift covering is prone to tearing, and gaps, both of which render exposure to the outside and risk of water entering the gap during rain, snow or otherwise inclement weather. In addition to these problems, the make-shift covering is frequently unsightly.

Various window inserts have been provided that fit within a window frame. For example, various screen devices have been provided shaped to fit within a window frame of a vehicle. These screen devices generally fit in conjunction with a non-broken window as an add-on and are not structurally or functionally adapted to address broken window glass issues. Generally the screen devices are appointed for allowing air to enter a vehicle, or to provide a sun-guard or protection.

Other devices include window sealing devices that are appointed to be applied over a window frame with glass therein, or over window glass in order to provide energy efficiency, insulation, privacy.

Additionally, various window inserts heretofore disclosed and utilized that are appointed to be utilized as temporary window constructs have been provided. Such structures include constructs wherein a closable bag-like element is slipped over a vehicle door frame having broken glass. Closure of the door is thereby facilitated when securing these types of devices. Such constructs do not actually fit within the window frame; but rather are placed over the window frame. Other types of devices that fit within the frame have been provided, wherein the temporary window is generally cut and shaped as a vehicle window, and is actually inserted into the window frame in place of the broken glass segment. Lastly, various window coverings have been provided wherein a thin sheet is taped over a window gap or broken window.

Despite the various window inserts and temporary window devices heretofore known and utilized, there remains a need in the art for a temporary window covering that is aesthetically appealing, easy to apply and durable. Further, there is a need in the art for a temporary window covering that can be placed in a window to provide optimal securement without gaps or other protrusions.

SUMMARY OF THE INVENTION

The present invention is directed to a temporary window apparatus especially well suited to provide a temporary window covering that is aesthetically appealing, easy to apply and durable. Gaps or other protrusions are avoided. The temporary window covering is readily installed with minimal expense; and operates in a highly reliable manner.

The temporary window includes at least two sheets of thin plastic resin each correspondingly comprising a center surrounded by at least one perimeter edge. The centers of the sheets are bonded to one another and the perimeter edges of the sheets are not bonded to one another. Each of the perimeter edges of the sheets has an inner surface with an adhesive coating substantially thereon. The perimeters are arranged in relation to one another so that the adhesive inner sides of the sheets create a v-shaped ravine adapted to adhere to a structure contiguous with an opening.

A method of using the temporary window is also provided. The method includes the steps of: (a) determining a size and shape of the temporary window corresponding to a structure contiguous with an opening; (b) cutting the temporary window to correspond with the size and shape of the opening; (c) opening the perimeter edges of the sheets to expose and open the v-shaped ravine; (d) removing a peel tab covering from the adhesive inner sides; (e) placing the temporary window into the structure opening and adhering the perimeter edges to the opening; and (f) pressing the inner surfaces of the sheets together to substantially adhere the sheets to one another.

BRIEF DESCRIPTION OF DRAWINGS

The invention will be more fully understood and further advantages will become apparent when reference is had to the following detailed description and the accompanying drawings, in which:

FIG. 1a illustrates a top plain view of an embodiment of the subject temporary window;

FIG. 4a is a top plain view of another embodiment wherein a zip-type opening is provided in the temporary window;

DESCRIPTION OF THE PREFERRED EMBODIMENTS

Figure 1B:
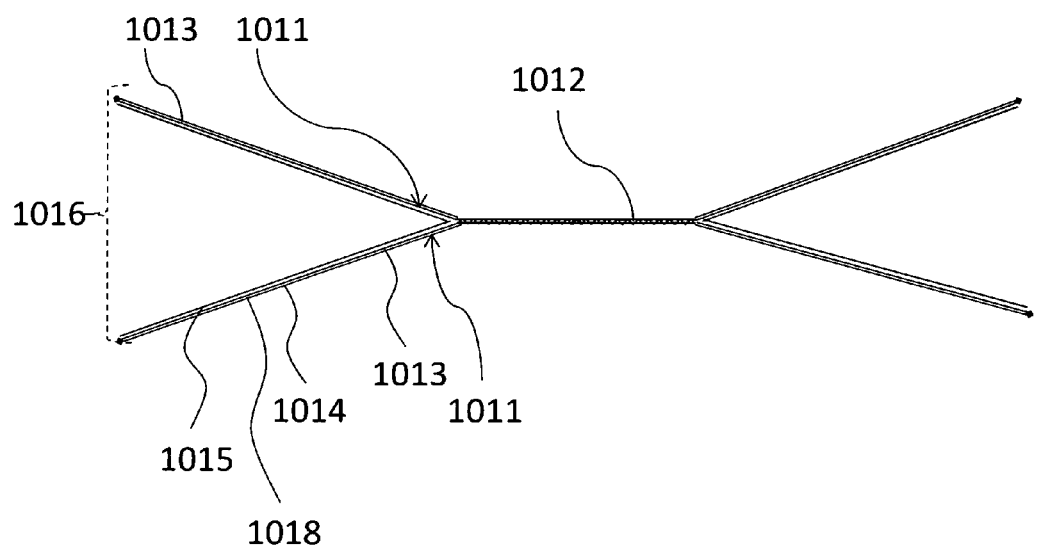
FIG. 1b is a cross-sectional view of the embodiment of FIG. 1a taken along line IV-IV.

The present invention is directed to a temporary window for use when temporarily covering a window opening when the glass is broken or otherwise non-functional. Uses include temporary windows for vehicles, land or water, cars, trucks, boats, etc, as well as windows in a residential or business establishment.

The subject temporary window generally involves two sheets of thin plastic resin that are joined together in the center but left apart around the perimeter to create a "V" shape. An adhesive is applied to the inner sides of the "V" and protected by a pull strip. When the pull strip is removed, the adhesive can be adhered to structures contiguous with an opening to create a temporary window fix. The adhesive may be a double-side adhesive type tape that can be applied by removing a tab from one side thereof and placing it on the desired length of each edge, then removing the tab on the other side of the adhesive to apply the temp window. The temporary window can optionally be equipped with a window opener for introduction of fresh air into the vehicle's passenger compartment.

The subject temporary window is especially well suited for use in a land vehicle. It is lightweight and easily packaged to be carried as a spare part in the trunk or back of a vehicle. If a window breaks, the subject temporary window can be readily installed to provide a more comfortable climate inside the vehicle until the broken window is repaired.

In a preferred embodiment, the temporary window is constructed such that there are two sheets open on both sides but connected in the middle, forming a butterfly type shape. The sides can be opened up for ready adjustment and placement over the broken window area.

The temporary window is appointed to temporarily be inserted into a window frame of a vehicle, land or otherwise, in order to substantially seal the window cut-out/frame and prevent exposure to the outside environment. Generally, the subject temporary window comprises at least one sheet composed of a thin material, preferably a thin plastic resin material that includes at least one outer perimeter edge with attachment means. Preferably the attachment means comprises an adhesive adapted to the sheet to a vehicle's window or window frame. In another embodiment, the temporary window comprises at least two sheets of thin plastic resin. Each of the plastic resin sheets correspondingly comprises a center surrounded by at least one perimeter edge having an adhesive surface/coating substantially on inner sides thereof. The perimeters of the two sheets are arranged in relation to one another so that the adhesive inner sides create a v-shaped ravine adapted to adhere to a structure contiguous with an opening. The adhesive inner sides are each preferably covered with a protective pull strip that can be removed. When the pull strip is removed, the adhesive can be adhered to structure contiguous with an opening to create the temporary window.

In operation, when a car or vehicle window breaks or is damaged, until it is repaired or replaced, the temporary window is placed within the window frame and the v-shaped ravine is opened to expose adhesive. The edges of the v-shaped ravine are secured on the inner sides of the window frame and the sheets are pressed together. The resultant temporary window covering is aesthetically appealing, easy to apply and durable. Application of the temporary window provides an optimal securement without creating gaps or other protrusions. Owing to the dual sheet construction, the temporary window covering provides optimal durability and strength from high wind velocities while driving at high speeds, such as those encountered during highway driving. Further, because both sheets are secured against the frame (on both sides of the frame) and the sheets' v-shaped area is then secured together, securement of the temporary window is very strong so that the temporary window can withstand high wind velocities without being blown from the window or damaged. The temporary window is appointed to temporarily be inserted into a window frame of a vehicle, land or otherwise, in order to substantially seal the window cut-out/frame and prevent exposure to the outside environment.

The temporary window can be made of a plethora of sizes and shapes to correspond and/or accommodate different vehicle types, including but not limited to, boats, cars, trucks, SUVs, RVs, campers, and/or air planes. The temporary window can be also sized and shaped to fit specific windows, including but not limited to for example, rear windows, windshields, front windows, back windows, small side windows, sunroofs, moon roofs, etc. Additionally, the temporary window may be alternatively designed for non-vehicle uses, such as being shaped and sized to correspond to windows in a home or office building in order to provide a temporary window for a house or building structure. Additionally, preferably the subject temporary window is composed of a transparent material; alternatively, the material may include UVB/UVA material to provide protection from sun rays and light. Other embodiments contemplated include integration of a thin polymeric screen integrated therein.

Referring to FIGS. 1a and 1b, the temporary window embodiment is shown generally at 1010. In the embodiment shown, the temporary window 1010 comprises at least two sheets of thin plastic resin 1011. Each sheet 1011 comprising a center 1012 surrounded by at least one perimeter edge 1013 with inner sides 1014 having an adhesive surface/coating 1015 substantially/virtually entirely coated thereon. In another embodiment, the adhesive may be a double-side adhesive tape that is to be applied by removing a tab from one side thereof and placing it on the desired length of each edge, then removing the tab on the other side of the adhesive to apply the temp window.

At center 1012 each sheet 1011 is bonded together via bonding or adhesive so that the sheets 1011 are attached at center 1012. The sheets 1011 perimeter edges 1013 are arranged in relation to one another so that the inner sides 1014 with adhesive coating 1015 create a v-shaped ravine 1016 (best viewed in FIG. 1b) when the sheets 1011 are spread apart to view or have access to inner sides 1014. Adhesive coating 1015 of inner sides 1014 is adapted to adhere to a structure contiguous with an opening. Herein, the perimeter edges 1013 extend around substantially the entire center 1012 of the temporary window 1010, providing an edge depth/shelf 1017. Alternatively, the perimeter edge 1013 may only be on one edge, two, three, or up to all edges of sheets 1011 as shown. Shelf 1017 ranges in depth, preferably ranging from about 0.5" up to about 5". However, the depth range can be modified to correspond to the given window structure that the temporary window 1010 is appointed to accommodate.

The inner sides 1014 with adhesive coating 1015 are each preferably covered with a protective pull strip 1018 (best viewed in FIG. 1b) that is appointed to be peeled off/removed to expose the adhesive 1015. When the pull strip 1018 is removed, the adhesive 1015 is then appointed to be adhered to a structure (such as the vehicle/window frame) contiguous with an opening to provide a temporary window construct. Preferably, adhesive 1015 on the inner side of each sheet 1011 attaches to opposite sides of the window frame, so that the frame is substantially embraced by the inner sides 1014. In another embodiment, the subject temporary window can optionally be equipped with a zip-lock window opener for introduction of fresh air into the vehicle's passenger compartment as illustrated by way of the embodiments of FIGS. 3-5. Also, it is contemplated that the temporary window comprises at least one sheet main body forming the center, and having at least one outer perimeter edge with attachment means, preferably in the form of an adhesive adapted to be secured to a vehicle's window or window frame locality (embodiment not shown). Essentially, the temporary window is formed as if two sheets of paper are placed upon one another with bonding at the center thereof. This center may be a larger surface area (as shown in FIGS. 3a, 3b for example) or may be a small central area as shown in FIG. 1.

Figure 2:
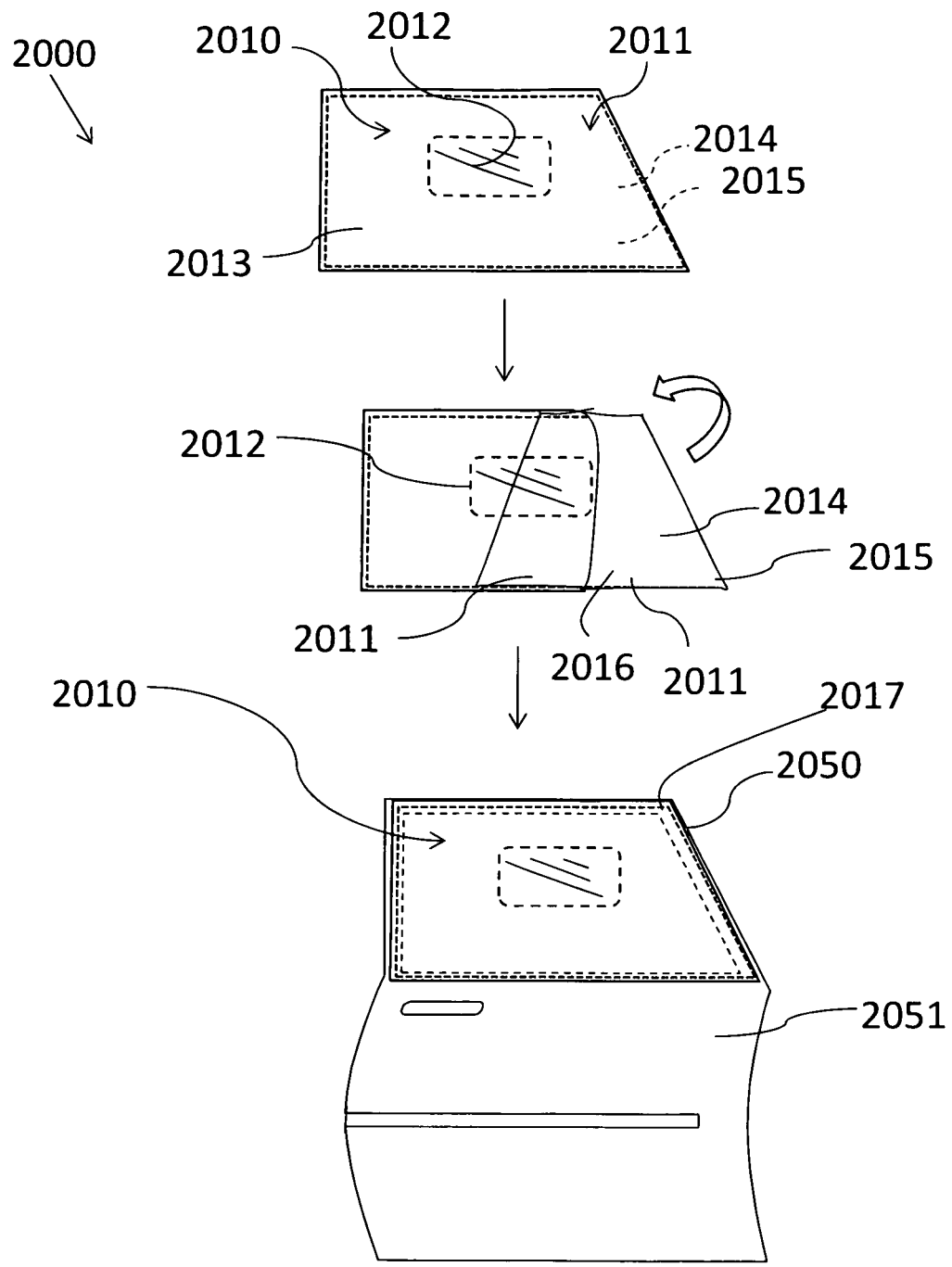
FIG. 2 illustrates insertion of the subject temporary window into a vehicle door window frame.

FIG. 2 illustrates insertion of the subject temporary window into a vehicle door window frame, shown generally at 2000. A temporary window 2010 is formed as discussed in FIG. 1. Window 2010 is preferably sized and shaped as shown to accommodate most car or SUV doors. Because the temporary window 2010 is composed of plastic material, the temporary window may generally have an elongated or rectangular or parallelogram shape and can readily be cut to size to accommodate a given vehicle door window frame as shown at 2050 in vehicle door 2051. Temporary window 2010 comprises at least two sheets of thin plastic resin 2011. Each sheet 2011 comprising a center 2012 surrounded by at least one perimeter edge 2013 with inner sides 2014 having an adhesive surface/coating 2015 substantially/virtually entirely coated thereon. The sheets 2011 perimeter edges 2013 are arranged in relation to one another so that the inner sides 2014 with adhesive coating 2015 create a v-shaped ravine 2016 when the sheets 2011 are spread apart to view or have access to inner sides 2014. Adhesive coating 2015 of inner sides 2014 is adapted to adhere to the frame 2051 of door 2050 providing a frame depth/shelf 2017. The remaining portion of the inner sides 2014 of each of the sheets 2011 then bond to one another so that the sheets are now substantially bonded to one another save for the perimeter area adhered to the frame 2051.

Figure 3A:
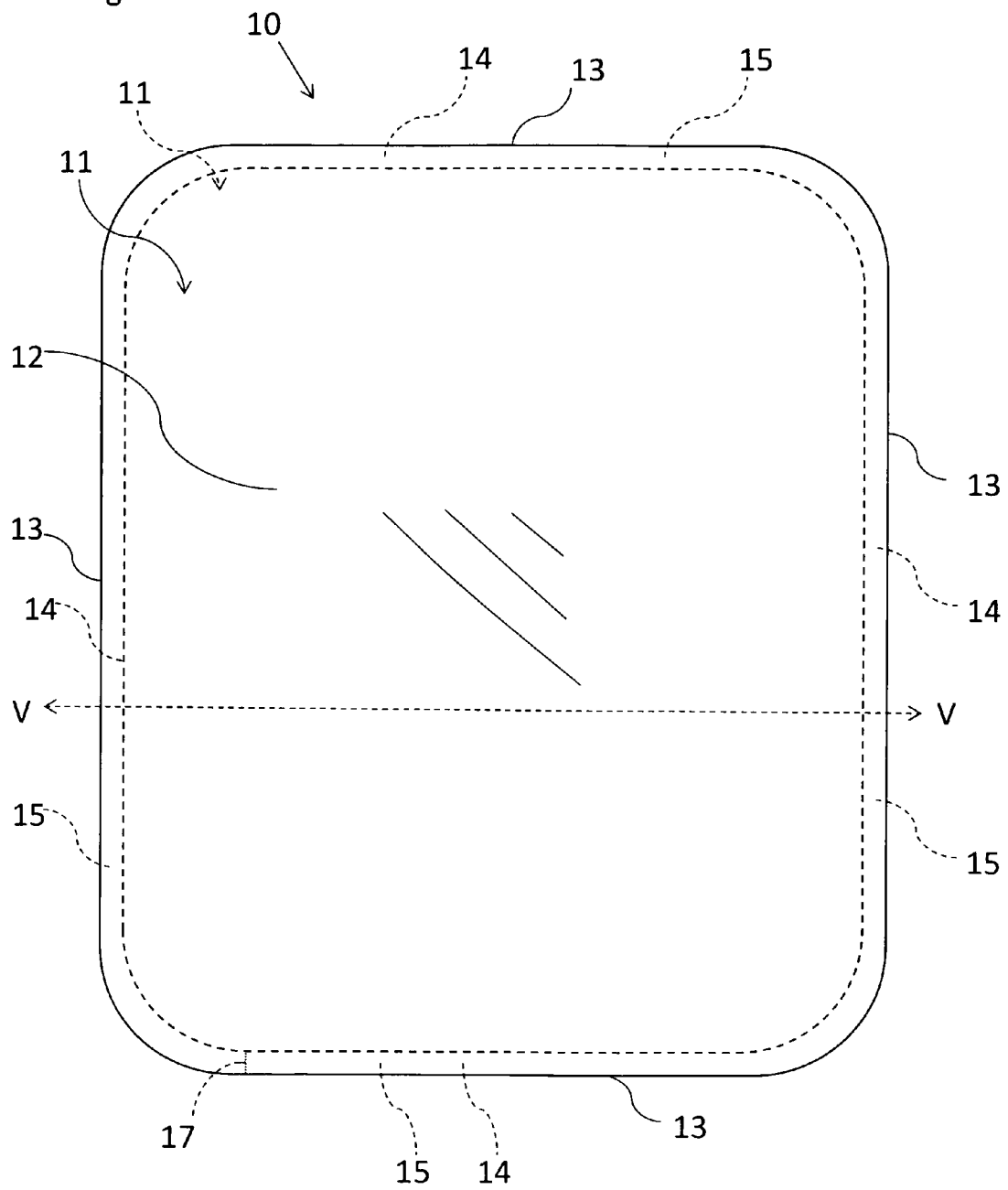
FIG. 3a is a top plain view of an embodiment of the subject temporary window.
Figure 3B:
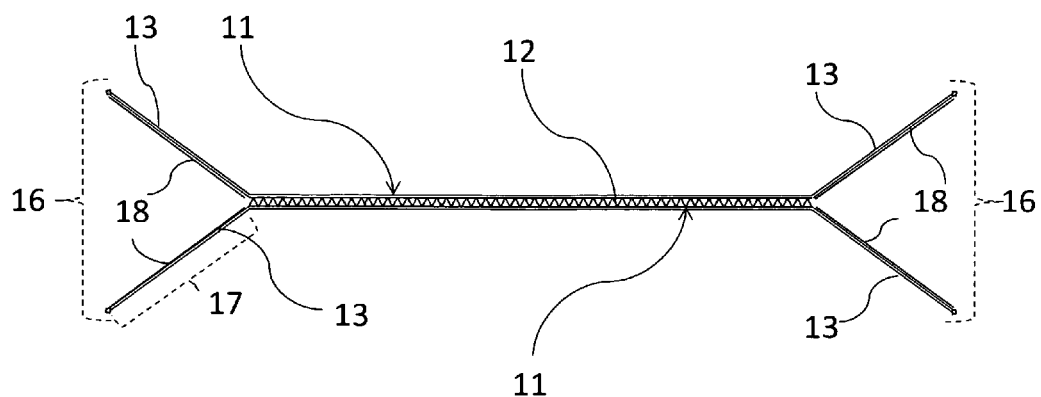
FIG. 3b is a cross-sectional view of the embodiment of FIG. 1a taken along line V-V.

Referring to FIGS. 3a and 3b, the temporary window embodiment is shown generally at 10. In the embodiment shown, the temporary window 10 comprises at least two sheets of thin plastic resin 11. Each sheet 11 comprising a center 12 surrounded by at least one perimeter edge 13 with inner sides 14 having an adhesive surface/coating 15 substantially/virtually entirely thereon. The sheets 11 perimeter edges 13 are arranged in relation to one another so that the inner sides 14 with adhesive coating 15 create a v-shaped ravine 16 (best viewed in FIG. 3b) adapted to adhere to a structure contiguous with an opening. Herein, the perimeter edges 13 extend around substantially the entire center 12 of the temporary window 10, providing an edge depth/shelf 17. Alternatively, the perimeter edge 13 may only be on one edge, two, three, or up to all edges of sheets 11 as shown. Shelf 17 ranges in depth, preferably ranging from about 0.5" up to about 5". However, the depth range shall be modified to correspond to the given window structure the temporary window 10 is appointed to accommodate. The inner sides 14 with adhesive coating 15 are each preferably covered with a protective pull strip 18 (best viewed in FIG. 3b) that is appointed to be peeled off/removed to expose the adhesive 15. When the pull strip 18 is removed, the adhesive 15 is then appointed to be adhered to a structure (such as the vehicle/window frame) contiguous with an opening to provide a temporary window construct. In another embodiment, the subject temporary window can optionally be equipped with a zip-lock window opener for introduction of fresh air into the vehicle's passenger compartment as illustrated by way of the embodiments of FIGS. 3-5. Also, it is contemplated that the temporary window comprises at least one sheet main body forming the center, and having at least one outer perimeter edge with attachment means, preferably in the form of an adhesive adapted to be secured to a vehicle's window or window frame locality (embodiment not shown).

Figure 4B:
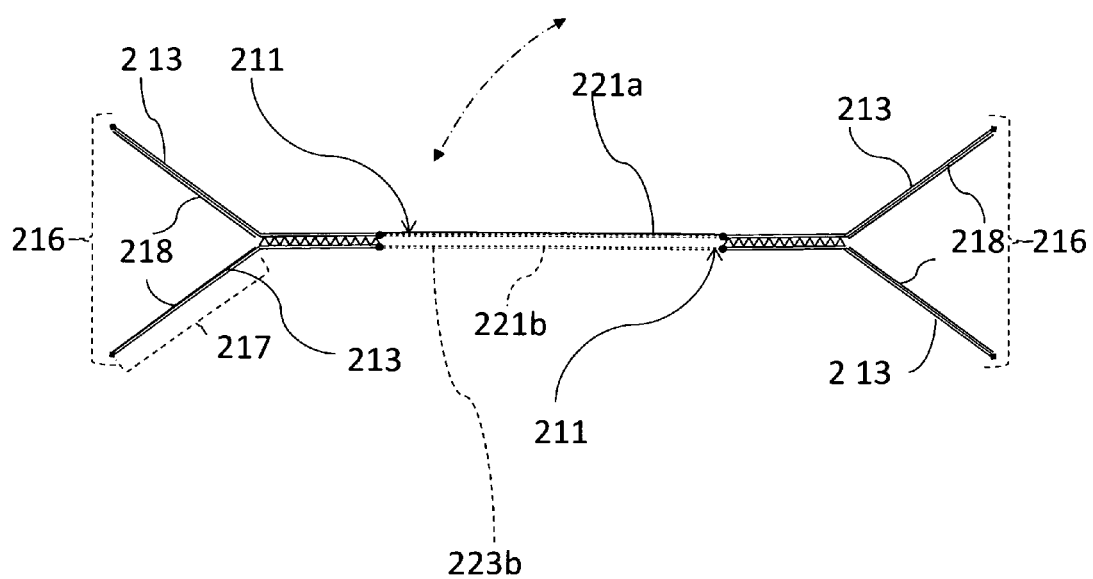
FIG. 4b is a cross-sectional view of the embodiment of FIG. 3a taken along line X-X.

Referring to FIGS. 4a and 4b, the temporary window embodiment shown is generally designated at 210. In this embodiment, the temporary window 210 comprises two sheets of thin plastic resin 211a, 211b having a center 212 surrounded by at least one perimeter edge 213 with inner sides 214 having an adhesive surface/coating 215 substantially/virtually entirely thereon. The sheets 211 perimeter edges 213 are arranged in relation to one another so that the inner sides 214 with adhesive coating 215 create a v-shaped ravine 216 adapted to adhere to a structure contiguous with an opening. The inner sides 214 with adhesive coating 215 are each preferably covered with a protective pull strip 218 (see FIG. 4b) that is appointed to be peeled off/removed to expose the adhesive 215. In this embodiment, the temporary window 210 includes an opening and closure means, preferably via a zip-lock window opener structure 220 for introduction of fresh air into the vehicle's passenger compartment. In the embodiment shown, a gap opening 221a with mating rims 222a, 222b is provided. Gap opening 221a is provided with zip-lock structure 220 on rims 222a, 222b so that zip-lock structure 220 moves there-along to open and close gap opening 221a. In turn, sheet 211b includes an exterior opening 221b. Exterior opening 221b may simply be provided as an opening or cut-out in sheet 211b. Alternatively, gap 221b may include a polymeric or thin resin screen 223b integrated therein to prevent bugs and debris from entering the temporary window 210 when in the gap opening 221a is in the open position. Alternatively, gap opening 221a may have a screen integrated therein.

Figure 5A:
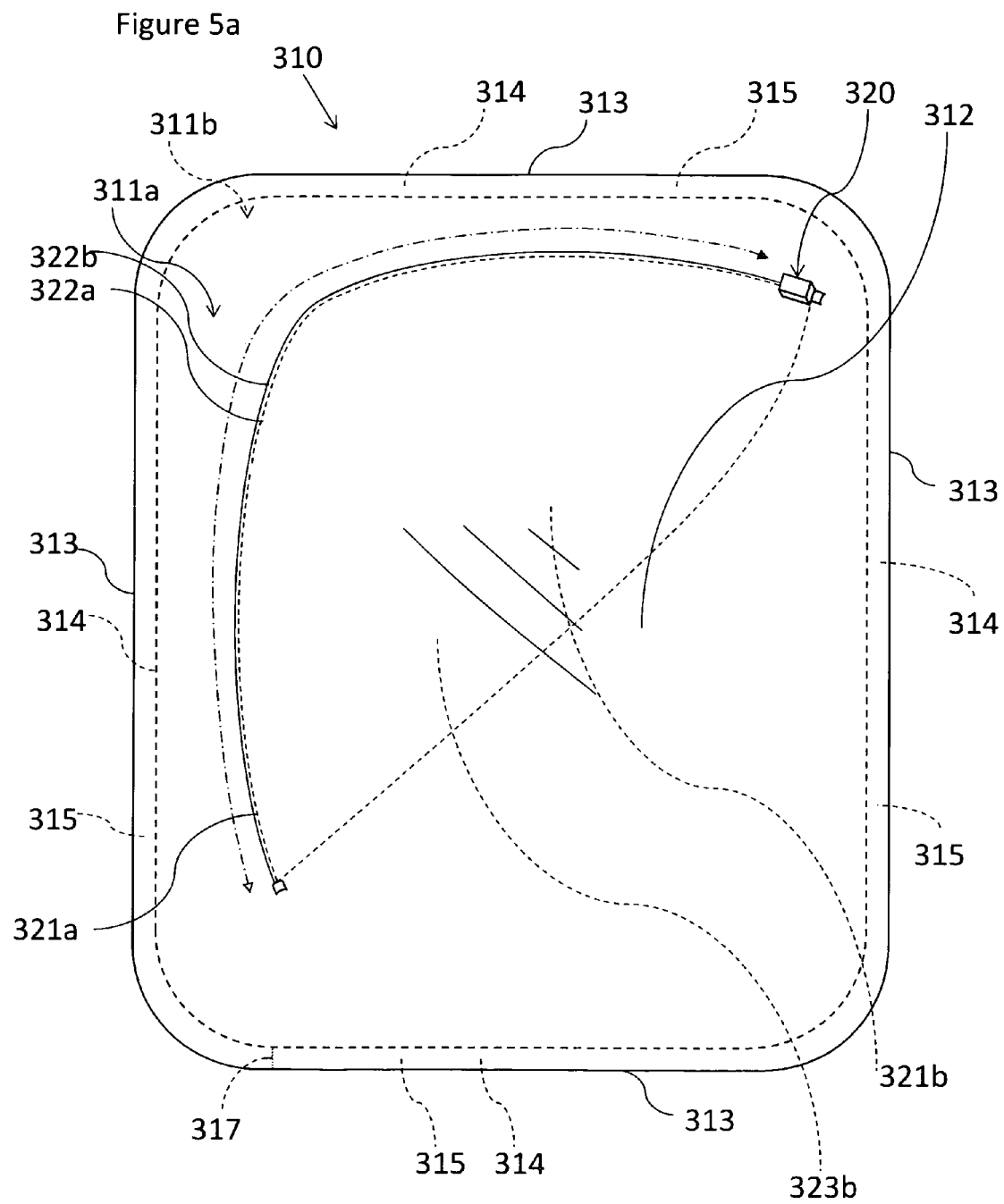
FIG. 5a illustrates a top plain view of another embodiment wherein a zip-type opening is provided in the temporary window, showing the opening in a closed configuration.
Figure 5B:
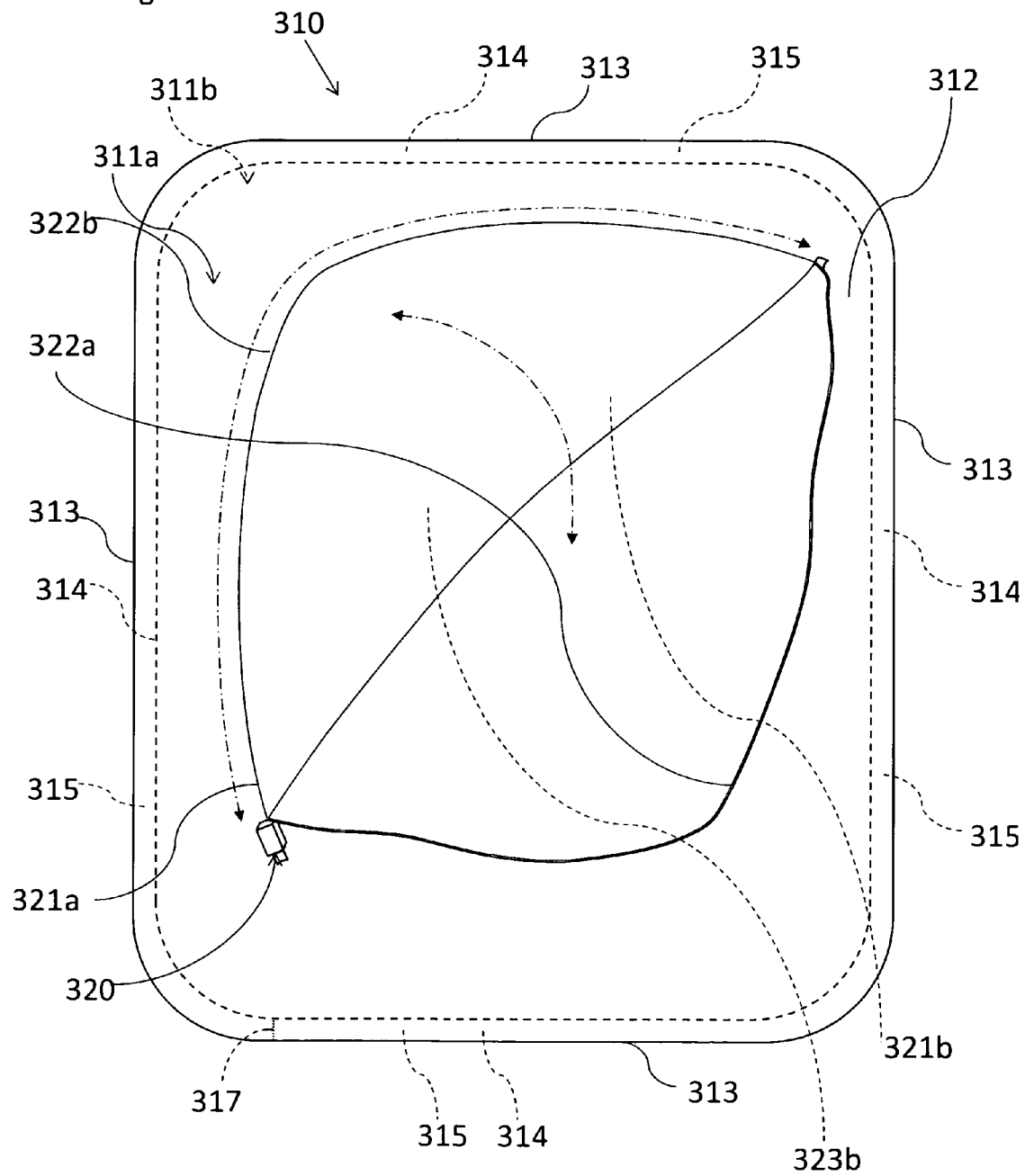
FIG. 5b illustrates the temporary window of FIG. 4a in the open configuration.

Referring to FIGS. 5a and 5b illustrated another embodiment of the temporary window shown generally at 310. In this embodiment, the temporary window 310 also includes two sheets of thin plastic resin 311a, 311b having a center 312 surrounded by at least one perimeter edge 313 with inner sides 314 having an adhesive surface/coating 315 substantially/virtually entirely thereon forming a v-shaped ravine adapted to adhere to a structure. The inner sides 314 with adhesive coating 315 are each preferably covered with a protective pull strip. In this embodiment, the temporary window 310 includes an opening and closure means, preferably via a zip-lock window opener structure 320 for introduction of fresh air into the vehicle's passenger compartment. In the embodiment shown, a gap opening 321a with rims 322a, 322b is integrated within sheet 311a. Gap opening 321a is provided with zip-lock structure 320 on rims 322a, 322b. In turn, sheet 311b includes a corresponding gap 321b. Gap 321b may simply be provided as an opening or aperture. Alternatively, gap 321b may include a polymeric or thin resin screen 323b integrated therein to prevent bugs and debris from entering the temporary window 310 when in the gap opening 321a is in the open position. Alternatively, gap opening 321a may have a screen integrated therein.

The temporary window is especially suited to be cut or shaped by a user to accommodate window structures of different shapes/sizes. In operation, the user can cut temporary window to fit the given window structure/frame. At least a portion of the shelf will remain even after cutting because the shelf is so large (see FIG. 1a). In which case, after cutting and shaping the temporary window to correspond to the given structure, the protective pull strip is removed and the exposed adhesive edges of sheets will adhere to one another at the sheet interface, and will adhere to the structure at the edges.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:
1. A temporary window comprising:
 a. at least two sheets of thin plastic resin each correspondingly comprising a center surrounded by at least one perimeter edge;
 b. said center of said sheets being bonded to one another and said perimeter edges of said sheets not being bonded to one another;
 c. each of said perimeter edges of said sheets having an inner surface with an adhesive coating substantially thereon;
 d. said perimeters being arranged in relation to one another so that said adhesive inner sides create a v-shaped ravine adapted to adhere to a structure contiguous with an opening;

e. said adhesive inner sides being covered with a protective covering associated with a pull tab Strip that is appointed to be removed for adherence to said structure; and f. a thin polymeric screen integrated between at least a portion of each of said two sheets.

2. A temporary window as recited by claim 1, wherein at least one of said sheets includes UVA/UVB protection therein.

3. A temporary window as recited by claim 1, wherein said perimeter edges of said sheets having said inner surface with said adhesive coating have a depth of at least about 5 inches.

4. A temporary window as recited by claim 1, wherein said center of said sheets includes a gap/opening for introduction of fresh air into a vehicle's passenger compartment.

5. A temporary window as recited by claim 4, wherein said gap includes an opening and closure means.

6. A temporary window as recited by claim 5, wherein said opening and closure means is constructed as a tongue and groove zip-locking structure.

7. A temporary window as recited by claim 4, wherein said gap includes a polymeric or thin resin screen integrated therein to prevent bugs and debris from entering said temporary window.

8. A temporary window as recited by claim 4, wherein said gap includes a screen.

9. A temporary window as recited by claim 1, wherein said sheets are composed of a transparent material.

10. A temporary window as recited by claim 1, wherein said adhesive is a double-side adhesive tape that is to be applied by removing a tab from one side thereof and placing it on a desired length of each edge of said sheets.

\* \* \* \* \*